United States Patent [19]

Boden et al.

[11] Patent Number: 5,300,624
[45] Date of Patent: Apr. 5, 1994

[54] METHOD FOR MAKING FLAME RETARDANT POLYCARBONATE

[75] Inventors: Eugene P. Boden, Scotia; Peter D. Phelps, Schenectady, both of N.Y.

[73] Assignee: General Electric Company, Schenectady, N.Y.

[21] Appl. No.: 66,381

[22] Filed: May 24, 1993

[51] Int. Cl.$^5$ .............................................. C08G 64/24
[52] U.S. Cl. .................... 528/199; 528/125; 528/126; 528/171; 528/174; 528/196; 528/198; 528/202
[58] Field of Search ............... 528/199, 198, 202, 125, 528/126, 171, 174, 196

[56] References Cited

U.S. PATENT DOCUMENTS

| | | | |
|---|---|---|---|
| 3,912,687 | 10/1975 | Haupt et al. | 528/199 |
| 4,794,156 | 12/1988 | Ho et al. | 528/202 |
| 4,902,758 | 2/1990 | Marks | 528/199 |
| 4,918,155 | 4/1990 | Komatsu et al. | 528/202 |

OTHER PUBLICATIONS

Article-Chemosphre, vol. 20, Nos. 10-12, pp. 1921-1928 (1990) Tetrabromobisphenol A (TBBA), its Derivatives and their Flame Retarded (FR) Polymers—Content of Polybrominated Dibenzo-p-Dioxins (PBDD) and Dibenzofurans (PBDF)—PBDD/F Formation under Processing and Smouldering (Worst Case) Conditions, J. Thies et al.

Article—Popular Plastics, Mar. 1983, (3 pages) Copolycarbbonates of Bisphenol-A and Tetra-halobisphenols-A: Synthesis and Characterization: Part III, KK Sharma et al.

Article—Polymer Bulletin 25, Jun. (1991) pp. 583-590, HPLC Analysis of Tetrabromobisphenol-A Polycarbonate Oligomers, Its Applications in Interfacial Phosgenation Reaction, Jen-Tau Gu and Chun-Shan Wang.

Article—Industrial & Engineering Chemistry, vol. 51, No. 2—Feb. 1959—pp. 157-160 Linear Aromatic Polyesters of Carbonic Acid, H. Schnell.

*Primary Examiner*—Harold D. Anderson
*Attorney, Agent, or Firm*—William A. Teoli; William H. Pittman

[57] ABSTRACT

A method is provided for making flame retardant polycarbonates by phosgenating a mixture of bisphenols having up to about 50 mole % of tetrahalobisphenols, such as tetrabromobisphenols. There is employed a mixture of a phase transfer catalyst and a tertiary organic amine to provide high molecular weight copolymer without excessive phosgene usage.

4 Claims, No Drawings

METHOD FOR MAKING FLAME RETARDANT POLYCARBONATE

CROSS REFERENCES TO RELATED APPLICATION

Reference is made to copending applications Ser. No. 08/066,380, filed May 24, 1993 and Ser. No. 08/066,382, filed May 24, 1993 filed concurrently herewith.

BACKGROUND OF THE INVENTION

The present invention relates to a method for making flame retardant polycarbonate copolymers having condensed polyhalo aromatic carbonate units. More particularly, the present invention relates to the phosgenation of bisphenol mixtures having up to about 50 mole % of polyhalo substituted bisphenol in the presence of an effective amount of a mixture of a tertiary organic amine and a phase transfer catalyst.

As shown by U.S. Pat. No. 3,912,687, tetrahalobisphenols can be polymerized under interfacial reaction conditions using relatively large amounts of trialkylamine catalyst in a two-stage reactor. However, a relatively low molecular weight polycarbonate is often formed. Polyhalobisphenol polycarbonates having a higher molecular weight can be made by the procedure shown by Ho et al, U.S. Pat. No. 4,794,156. Phosgene is added to an alkali metal polyhalobisphenate salt to produce the corresponding chloroformate. An activated pyridine, such as 4-dimethylaminopyridine, or 2-substituted pyridine is then added to increase the molecular weight of the resulting polycarbonate.

A method for making block copolycarbonates from diphenols and tetrahalogenated diphenols by phosgenation under interfacial reaction conditions is shown by Marks, U.S. Pat. No. 4,902,758. A mixture of bisphenol and a tetrahalogenated bisphenol are phosgenated under interfacial reaction conditions at different pH's to form bisphenol polycarbonate oligomers having chloroformate end groups and tetrahalogenated bisphenol chloroformate monomers. During a subsequent step, the chloroformate oligomers and monomers are coupled utilizing an activated pyridine catalyst. Another procedure for making copolymers of bisphenol A and a halogenated bisphenol utilizing a pentahalogenophenol as a molecular weight modifier, is shown by Komatsu et al, U.S. Pat. No. 4,918,155.

Although various procedures have been employed to phosgenate polyhalobisphenols and mixtures of polyhalobisphenols and bisphenols substantially free of aromatic ring substituted halogen groups, the molecular weight of the resulting polycarbonates are often lower than expected, and the phosgene requirements are often excessively high. More efficient condensation catalysts are therefore constantly being evaluated to minimize phosgene usage while improving molecular weithts of polycarbonate having polyhalo carbonate units.

SUMMARY OF THE INVENTION

The present invention is based on the discovery that if a mixture of a phase transfer catalyst and a tertiary organic amine, as defined hereinafter, is used as the condensation catalyst during the phosgenation of bisphenol mixtures having up to 50 mole % of polyhalobisphenol, an improvement in the conversion of such bisphenols to polycarbonates can be achieved without excess usage of phosgene. In addition, an increase in the molecular weight of the resulting polyhalogenated bisphenol polycarbonates often can be achieved.

STATEMENT OF THE INVENTION

There is provided by the present invention, a method for making flame retardant polycarbonates which comprises, (1) phosgenating a tetrahalobisphenol mixture comprising up to about 50 mole % of a bisphenol of the formula,

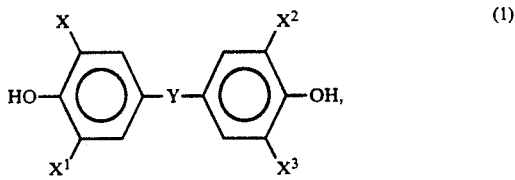

where $X$–$X^3$ are halogen atoms, and Y can be —O—, —S—,

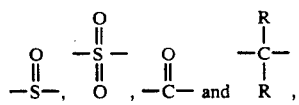

and R is a $C_{(1-4)}$ alkyl group, under interfacial reaction conditions at a pH in the range of about 9 to about 11 and in the presence of an effective amount of a condensation catalyst comprising a mixture of a tertiary organic amine and a phase transfer catalyst, until up to about 90 mole % of the phosgene required to react with the available phenolic hydroxy groups in the mixture has been introduced, (2) altering the pH of the mixture to a range of about 10.5 to 12, to effect the substantial elimination of chloroformate groups in the resulting reaction mixture of (1), and (3) further introducing into the mixture of (2), at least a stoichiometric amount, and up to about a 3 mole % excess of phosgene based on the total moles of phenolic hydroxy groups in the bisphenol mixture of (1).

Halogenated bisphenols included with formula (1) are for example, 2,2-bis(3-5-dichloro-4-hydroxyphenyl)propane, 2,2-bis-(3-5-dibromo-4-hydroxyphenyl)propane, 2,2-bis(3-chloro-4-hydroxyphenyl)propane, and 2,2-bis(3-bromo-4-hydroxyphenyl)propane.

Bisphenols which can be copolymerized with the halogenated bisphenols of formula (1) are preferable compounds included within the formula,

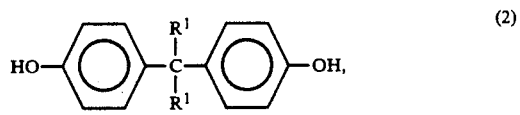

where $R^1$ is selected from the same or different $C_{(1-4)}$ alkyl groups.

Bisphenols which can be copolymerized with the tetrahalobisphenols of formula (1) are for example,
resorcinol
4-bromoresorcinol
hydroquinone
4,4'-dihydroxybiphenyl
1,6-dihydroxynaphthalene
2,6-dihydroxynaphthalene bis(4-hydroxypenyl)methane
bis(4-hydroxyphenyl)diphenylmethane
bis(4-hydroxyphenyl)-1-naphthylmethane
1,1-bis(4-hydroxyphenyl)ethane
1,2-bis(4-hydroxyphenyl)ethane
1,1-bis(4-hydroxyphenyl)-1-phenylethane
2,2-bis(4-hydroxyphenyl)propane ("bisphenol A")
2-(4-hydroxyphenyl)-2-)3-hydroxyphenyl)propane
2,2-bis(4-hydroxyphenyl)butane
1,1-bis(4-hydroxyphenyl)isobutane
1,1-bis(4-hydroxyphenyl)cyclohexane
1,1-bis(4-hydroxyphenyl)cyclododecane
trans-2,3-bis(4-hydroxyphenyl)-2-butene
2,2-bis(4-hydroxyphenyl)adamantane
α,α'-bis(4-hydroxyphenyl)toluene
bis(4-hydroxyphenyl)acetonitrile
2,2-bis(3-methyl-4-hydroxyphenyl)propane
2,2-bis(3-ethyl-4-hydroxyphenyl)propane
2,2-bis(3-n-propyl-4-hydroxyphenyl)propane
2,2-bis(3-isopropyl-4-hydroxyphenyl)propane
2,2-bis(3-sec-butyl-4-hydroxyphenyl)propane
2,2-bis(3-t-butyl-4-hydroxyphenyl)propane 2,2-Bis(3-cyclohexyl-4-hydroxyphenyl)propane
2,2-bis(3-allyl-4-hydroxyphenyl)propane
2,2-bis(3-methoxy-4-hydroxyphenyl)propane
2,2-bis(4-hydroxyphenyl)hexafluoropropane
1,1-dichloro-2,2-bis(4-hydroxyphenyl)ethylene
1,1-dibromo-2,2-bis(4-hydroxyphenyl)ethylene
1,1-dichloro-2,2-bis(5-phenoxy-4-hydroxyphenyl)ethylene
4,4'-dihydroxybenzophenone
3,3-bis(4-hydroxyphenyl)-2-butanone
1,6-bis(4-hydroxyphenyl)-1,6-hexanedione
ethylene glycol bis(4-hydroxyphenyl)ether
bis(4-hydroxyphenyl)ether
bis(4-hydroxyphenyl)sulfide
bis(4-hydroxyphenyl)sulfoxide
bis(4-hydroxyphenyl)sulfone
9,9-bis(4-hydroxyphenyl)fluorene
2,7-dihydroxypyrene
6,6'-dihydroxy-3,3,3',3'-tetramethylspiro(bis)indane("spirobiindane bisphenol")
3,3-bis(4-hydroxyphenyl)phthalide
2,6-dihydroxydibenzo-p-dioxin
2,6-dihydroxythianthrene
2,7-dihydroxyphenoxathiin
2,7-dihydroxy-9,10-dimethylphenazine
3,6-dihydroxydibenzofuran
3,6-dihydroxydibenzothiophene
2,7-dihydroxycarbazole Phase transfer catalysts which can be employed in the practice of the present invention are for example,

[CH$_3$(CH$_2$)$_3$]$_4$NX

[CH$_3$(CH$_2$)$_3$]$_4$PX

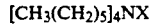[CH$_3$(CH$_2$)$_5$]$_4$NX

[CH$_3$(CH$_2$)$_6$]$_4$NX

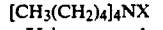[CH$_3$(CH$_2$)$_4$]$_4$NX where X is a member selected from the group of Cl Br and —OR$^2$, and R$^2$ is selected from hydrogen, C$_{(1-8)}$ alkyl and C$_{(10-18)}$ aryl.

Tertiary organic amines which can be utilized in the practice of the present invention are for example,
triethylamine
tributylamine,
N-methyldiethylamine
Nd,N-dimethylbutylamine
tripropylamine
N-ethylpiperidine, and
N-methylpiperidine.

There can be employed as the condensation catalyst, from about 0.25 to 4.0 moles of tertiary organic amine, per mole of phase transfer catalyst, and preferably from 0.5 to 1.5 moles of tertiary organic amine, per mole of phase transfer catalyst. An effective amount of condensation catalyst which can be utilized during the phosgenation of the mixture of bisphenol is about 0.1% to 10% by weight, and preferably 0.5% to 2% by weight based on the weight of the bisphenol.

In the practice of the preferred method of the present invention, a mixture of about 1 to about 50 mol % of the halogenated bisphenol of formula (1) and about 50 to about 99 mol % of the bisphenol of formula (2) can be used with a phenolic chain stopper. The phenol mixture can be phosgenated under interfacial reaction conditions in the presence of an organic solvent and an effective amount of the condensation catalyst. Phosgenation can be effected at a pH in the range of from about 9 to 11. Suitable organic solvents which can be used are for example, chlorinated aliphatic hydrocarbons, such as methylene chloride, chloroform, carbon tetrachloride, dichloroethane, trichloroethane, tetrachloroethane, dichloropropane and 1,2-dichloroethylene; substituted aromatic hydrocarbons such as, chlorobenzene, o-dichlorobenzene, and the various chlorotoluenes. The chlorinated aliphatic hydrocarbons, especially methylene chloride, are preferred.

Sufficient alkali metal hydroxide can be utilized to raise the pH of the bisphenol reaction mixture prior to phosgenation to a value of about 9 to 10 to provide dissolution of some of the bisphenol into the aqueous phase.

Aqueous alkali, or alkaline earth metal hydroxide can be used to maintain the pH of the phosgenation mixture at the pH set point. Some of the alkali metal or alkaline earth metal hydroxides, which can be employed are for example, sodium hydroxide, potassium hydroxide, and calcium hydroxide. Sodium and potassium hydroxides, and particularly sodium hydroxide is preferred. The concentration of the alkali hydroxide solution which is utilized is not critical and can be between about 0.2-19M. Aqueous metal hydroxide alkali concentrations of at least 5M are preferred.

The polyhalobisphenol polycarbonate can be made in a wide variety of either batch or continuous reactors. Such reactors are, for example, stirred tank reactors, which may be either batch or continuous flow. Additional reactors which are included are agitated column and recirculating loop continuous reactors.

The volume ratio of aqueous to organic phase during and at the termination of the phosgenation reaction can be in the range of about 0.2-1:1. Reaction temperatures can be in the range of between about 15°-50° C. When methylene chloride is used, the reaction may be conducted at reflux which can be 35°-42° C. The reaction can be conducted at atmospheric pressures, although sub- or superatmospheric pressures may be employed if desired.

During phosgenation, the mixture is agitated, such as, by using a stirrer or other conventional equipment. The phosgenation rate can vary from between about 0.02-0.2 mol of phosgene, per mol of bisphenol per minute.

In order that those skilled in the art will be better able to practice the present invention, the following example is given by way of illustration and not by way of limitation. All parts are by weight unless otherwise indicated.

EXAMPLE

A 2 L, 5-necked Morton flask equipped with a mechanical stirrer, a pH electrode, a dip tube for addition of NaOH, a dip tube for addition of phosgene, and a cold water condenser was charged with 79.8 g of bisphenol A (0.350 mol), 79.8 g of 2,2-bis-(3,5-dibromo-4-hydroxyphenyl)propane (0.147 mol), 4.0 g of cumyl phenol (0.0188 mol, 3.8 mol %), 800 mL of $CH_2Cl_2$, 200 mL water, 0.50 mL of triethylamine (0.0035 mol, 0.7 mol %), and 2.2 mL of a 40 wt % of tetrabutylammonium hydroxide solution (0.0035 mol, 0.7 mol %). A peristaltic pump interfaced with a pH controller was used to add an aqueous NaOH solution (9.94 molar) to the reaction mixture when the pH dropped below a desired set point. Initially, 46 g of the phosgene was added at 3.0 g/min while maintaining the pH at 9.5. The pH was then adjusted to 10.8 and agitation was continued for 8-10 minutes until chloroformates were no longer detected. An additional 5.0 g of phosgene was added over 2.5 minutes at a pH of 10.8. Thus, a total of 51.0 g of phosgene (1.02 eq based on phenolics) was added to the reaction mixture. Following a normal work-up and isolation, a polymer of Mw 42,100 was obtained.

The above procedure was repeated except tetrabutylammonium hydroxide was not employed. There was used 0.7 mol % triethylamine. Following the initial phosgenation, chloroformates were still present after 3.5 hours. Even though only 90% of the required phosgene had been added, there were still more phenolics present than chloroformates.

An additional phosgenation procedure was run in the absence of tetrabutylammonium hydroxide. However, a much higher level (6.0 mol %) of triethylamine was employed as the condensation catalyst. There was used a 2 L, 5-necked Morton flask equipped with a mechanical stirrer, a pH electrode, a dip tube for addition of NaOH, a dip tube for addition of phosgene, and a cold water condenser. There was charged 79.8 g of bisphenol A (0.350 mol), 79.8 g of tetrabromo bisphenol A (0.147 mol), 4.0 g of cumyl phenol (0.0188 mol, 3.8 mol %), 800 mL of $CH_2Cl_2$, 200 mL water, and 4.3 mL of triethylamine (0.030 mol, 6.0 mol %). A peristaltic pump interfaced with a pH controller was used to add an aqueous NaOH solution (9.94 molar) to the reaction mixture when the pH dropped below a desired set point. Initially, 46 g of phosgene was added at 3.0 g/min while maintaining the pH at 9.5. The pH was then adjusted to 10.8 and phosgenation was continued at 2.0 g/min until a total of 65.0 g of phosgene (1.30 eq) had been added to the reaction mixture. In this case, the chloroformates lasted for approximately 5 minutes. Addition of 2.0 g of phosgene produced no observable chloroformates, indicating the reaction was complete. Following a normal work-up and isolation, a polymer of Mw 39,700 was obtained.

Although the above example is directed to only a few of the very many variables which can be employed in the practice of the method of the present invention, it should understood that the present invention is directed to a much broader variety of flame retardant polycarbonate copolymers resulting from the phosgenation of mixtures of bisphenols of formulas (1) and (2) in the presence of a condensation catalyst in the form of a mixture of a phase transfer catalyst and a tertiary organic amine.

What is claimed is:

1. A method for making flame retardant polycarbonates which comprises, (1) adding phosgene to a tetrahalobisphenol mixture comprising up to about 50 mole % of a bisphenol of the formula,

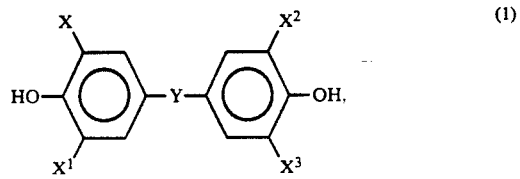

where $X$-$X^3$ are halogen atoms, and Y is a member selected from the group consisting of —O—, —S—,

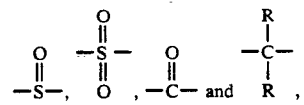

and R is a $C_{(1-4)}$ alkyl group, under interfacial reaction conditions at a pH in the range of about 9 to about 11 and in the presence of an effective amount of a condensation catalyst mixture comprising a tertiary organic amine and a phase transfer catalyst until up to about 90 mole % of the phosgene required to react with the available phenolic hydroxy groups in the mixture has been introduced, (2) altering the pH of the mixture to a range of about 10.5 to 12 to effect the substantial elimination of chloroformate groups in the resulting reaction mixture of (1), and (3) further introducing into the mixture of (2), at least a stoichiometric amount, and up to about a 3 mole % excess of phosgene based on the total moles of phenolic hydroxy groups in the bisphenol mixture of (1).

2. A method in accordance with claim 1, where the bisphenol mixture which is phosgenated consists essentially of tetrabromobisphenol A and bisphenol A.

3. A method in accordance with claim 1, where the condensation catalyst consists of a mixture of tetrabutylammonium hydroxide and triethylamine.

4. A method in accordance with claim 1, where comprising adding cumyl phenol as a chain-stopper.

* * * * *